US011463877B1

(12) United States Patent
Korbis (10) Patent No.: US 11,463,877 B1
(45) Date of Patent: Oct. 4, 2022

(54) CARRIER-BASED BLOCKING OF CONTRABAND DEVICES AT A CORRECTIONAL FACILITY

(71) Applicant: MDESS, LLC, Beavercreek, OH (US)

(72) Inventor: Je'an Korbis, Adelaide (AU)

(73) Assignee: MDESS, LLC, Beavercreek, OH (US)

( * ) Notice: Subject to any disclaimer, the term of this patent is extended or adjusted under 35 U.S.C. 154(b) by 0 days.

(21) Appl. No.: 17/643,542

(22) Filed: Dec. 9, 2021

Related U.S. Application Data (63) Continuation of application No. 17/452,728, filed on Oct. 28, 2021.

(51) Int. Cl.
*H04W 12/088* (2021.01)
*H04W 12/082* (2021.01)
*H04W 12/80* (2021.01)
*H04W 12/71* (2021.01)

(52) U.S. Cl.
CPC ....... *H04W 12/088* (2021.01); *H04W 12/082* (2021.01); *H04W 12/71* (2021.01); *H04W 12/80* (2021.01)

(58) Field of Classification Search
CPC . H04W 12/088; H04W 12/082; H04W 12/71; H04W 12/80
See application file for complete search history.

(56) References Cited

U.S. PATENT DOCUMENTS

| | | | | |
|---|---|---|---|---|
| 2001/0036821 | A1* | 11/2001 | Gainsboro | H04M 3/2281 455/410 |
| 2011/0319010 | A1* | 12/2011 | Nelkenbaum | H04W 12/12 455/67.11 |
| 2018/0167774 | A1* | 6/2018 | Hodge | H04W 4/029 |

* cited by examiner

*Primary Examiner* — Mazda Sabouri
(74) *Attorney, Agent, or Firm* — Arentfox Schiff LLP (57) ABSTRACT

Aspects for carrier-based blocking of contraband telecommunication devices are disclosed. In one such aspect, an entity (broadly referenced as a contractor) establishes a network at a correctional facility to collect raw data including telecommunications signaling and identifier data during a preconfiguration period. The data is then stored in a memory and processed by a processing system to determine devices that may be contraband. After the Department of Corrections (DOC) authorizes the activity by the contractor to control the devices, the contractor may send a list of contraband devices to the GSMA, the international carrier governing body, or an affiliate or designee thereof, to include in its database(s) this information. The carriers may prevent access by the contraband devices to remote networks by using a database from which an indicator can be provided when access is attempted.

12 Claims, 6 Drawing Sheets

CARRIER-BASED BLOCKING OF CONTRABAND DEVICES AT A CORRECTIONAL FACILITY

CROSS-REFERENCE TO RELATED APPLICATIONS

This application is a continuation of, and claims the right of priority to, U.S. application Ser. No. 17/452,728, filed Oct. 28, 2021 and entitled "CARRIER-BASED BLOCKING OF TELECOMMUNICATION DEVICES AT CORRECTIONAL FACILITY", the disclosure of which is hereby incorporated by reference in its entirety as if fully set forth herein.

BACKGROUND

Technical Field

The present disclosure generally relates to communication systems, and more particularly, to carrier-based blocking of contraband telecommunication devices.

INTRODUCTION

The use of contraband wireless devices, including mobile phones, tablets, etc., by inmates at a correctional facility remains an ongoing problem. Sometimes these calls, texts or social media transmissions, etc., are innocuous policy violations at the facility. A significant number of calls and texts based on contraband devices, however, are more sinister. They have been shown to order the deaths of individuals in "hits", facilitate smuggling of controlled substances and weapons into the facility, set up means for escape attempts, initiate organized gang violence, etc.

Conventional attempts to address contraband devices include the correctional facility contracting a specialized firm to take up long-term or permanent residence at the correctional facility. The contractor may include its own facility-specific telecommunications network and base station to regulate all voice and data transmissions to and from the facility. Ideally, the antennas and network components are positioned such that all communications, authorized or otherwise, are routed through this internal network to confirm they are legitimate. The internal network may block transmissions from suspicious or confirmed contraband devices, and may gather information from the transmissions for investigative purposes.

One problem with this implementation is the potentially exorbitant cost to the facility of running the internal network on a 24/7 basis. Another problem is the network itself. The antennas' transmissions can "bleed" out of the facility, inadvertently blocking legitimate transmissions from citizens that happen to be driving by the facility, for example. The opposite problem may occur where the antenna power is reduced to avoid bleeding but where the reduction is sufficient to enable contraband devices to access external base stations, and hence bypass the very protections put in place to prevent this activity.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Conventional solutions to contraband include retaining a contractor firm to situate itself at the facility and set up a "managed access system" (MAS) including an intermediary wireless network having base stations, monitoring equipment, etc. For purposes of this disclosure, a MAS need not be in any fixed location. A MAS can include either a mobile or a fixed network, or a combination of both, including any cellular network for gathering relevant data. The base station's antennas are directed and powered to cover the facility grounds. Inmates may often attempt to use contraband wireless devices including cellular telephones, disposable phones, and even tablets and personal computers (PCs) over the wireless network for voice calls, texts, instant messages, VoIP transmissions, and the like. Ideally, the MAS authorizes legitimate calls from pre-authorized phones, etc. and intercepts unauthorized transmissions. The MAS may include a central facility on the premises using servers to gather and process information about the unauthorized transmissions, to add devices to the contraband list, and to facilitate investigative efforts of the facility staff into related illegal activities.

This present solution can be prohibitively expensive. For one, the facility must be monitored on a 24/7 basis. The maintenance of the equipment and contracted staff likely burdens the allotted budgets of these facilities. Technical challenges also must be addressed. Examples include where the antennas from the base station at the facility inadvertently "bleed" to regions outside the facility. Otherwise legitimate calls may be intercepted or cut off. Similarly, the facility may include spotty regions where inmates can access external base stations using contraband devices. The problems are exacerbated in an urban environment, where the potential number of networks and individuals near the facility increase.

Aspects of the present disclosure overcome the above-stated problems and other shortcomings with this approach.

In an aspect of the disclosure, a system and apparatus are provided. The system for blocking contraband telecommunication devices within a correctional facility may include a telecommunication carrier network, memory configured to store telecommunication signaling and device identifier data collected within the correctional facility during a preconfiguration period, and a processing system. The processing system may be configured to identify a contraband telecommunication device within the correctional facility based on the stored data, wherein the contraband telecommunication device is a subscriber with the telecommunication carrier network. The telecommunication carrier network may include a gateway configured to connect subscribers to a remote network, and a database. The database may be configured to store information provided by the processing system related to the contraband telecommunication device. The database may be configured to provide an indicator to the gateway in response to an attempt by the contraband telecommunication device to connect to the remote network. The gateway may further be configured to prevent the contraband telecommunication device from connecting to the remote network in response to the indicator from the database.

In another aspect of the disclosure, a system for blocking contraband telecommunication devices within a correctional facility may include a telecommunication carrier network, memory configured to store telecommunication signaling and device identifier data gathered over a period of time within the correctional facility, and a processing system. The processing system may be configured to identify a contraband telecommunication device within the correctional facility based on the stored data, wherein the contraband telecommunication device is a subscriber with the telecommunication carrier network. The telecommunication carrier network may include a gateway configured to connect subscribers to a remote network, and a database. The database may be configured to store information provided by the processing system related to the contraband telecommunication device. An indicator may be provided to the gateway in response to an attempt by the contraband telecommunication device to connect to the remote network. The gateway may be configured to prevent the contraband telecommunication device from connecting to the remote network in response to the indicator.

In still another aspect of the disclosure, an apparatus for blocking contraband telecommunication devices within a correctional facility may include memory configured to store telecommunication signaling and device identifier data gathered during a preconfiguration period within the correctional facility. The apparatus may also include a processing system configured to communicate with a telecommunication carrier network, and identify a contraband telecommunication device within the correctional facility based on the stored data, wherein the contraband telecommunication device is a subscriber with the telecommunication carrier network. The apparatus may further include a transceiver coupled to the processing system and configured to transmit to the telecommunication carrier network an identifier of the contraband telecommunication device and validation information sufficient to authorize the telecommunication carrier network to prevent an attempt by the contraband telecommunication device to connect to a remote network via a gateway of the telecommunication carrier network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), Software defined Radio (SDR), Power Amplifiers (PA), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

Various aspects of the present disclosure describe carrier-based blocking of unauthorized voice or data-based transmissions to or from identified contraband wireless devices at an inmate correctional facility. Conventional techniques rely on a contracting firm placing a permanent network at the correctional facility. A base station and related server system is established as part of a MAS. One significant disadvantage with this approach is the potentially exorbitant expense to the facility to have a permanent firm performing this cellular contraband regulation 24 hours a day, seven days a week for a possibly indefinite period. Additional shortcomings relate to the problems that occur when the network inadvertently "bleeds" into the surrounding area, resulting in civilians' cellular equipment being affected by the prison network. If the contracting firm attempts to fix this problem (particularly in an urban environment involving other base stations in the proximity of the facility) by reducing the transmission and receive power of the on-site base station (s), then it may become possible for inmates to reach external base stations using contraband phones. The inmates may then altogether bypass the restrictions in place.

According to one aspect of the disclosure, the contraband equipment is blocked on a carrier level, rather than directly at the correctional facility. In the aspects disclosed herein, only one or a few initial pre-configuration periods (or a few such periods) are used in which a network is set up at the correctional facility. During that time, a temporary network configuration is set up at the correctional facility. This configuration may include, for example, one or more base stations, one or more transceivers, a server with a processor, and a gateway for selectively allowing data from the correctional facility to pass to a remote network, e.g., a network outside of the correctional facility. Other monitoring equipment may be used as necessary, such as spectrum analyzers, repeaters, etc.

Using this temporary network during a preconfiguration period, the contractor collects transmitted data from the devices around the prison. Once the relevant transmitted data is collected, the information may be stored in memory for subsequent processing. Following that initial period, the contracting firm may remove the network, including the equipment, and perform the remaining analyses off-site. For example, the contractor may have a facility housing its own server with a processing system for evaluating the collected data, and a memory for storing the data. The historical data collected based on transmissions from both contraband and legitimate phones and other network devices are stored in the memory at the facility. In addition, as described below, various sources of third party data may be provided to users of the processing system and used in connection with making determination whether devices are contraband.

The memory may, for example, be a data repository including one or more non-volatile memory devices. The contractor's location may include a server. The server may include the processing system and the memory. The processing system may include a user interface to enable one or more users (e.g., data analysts, investigators, etc.) to retrieve data from the connected memory, and to study the historical data and manipulate it as necessary. Based on a number of different criteria, such as the list of approved network devices (e.g., used by guards and prison personnel) provided by the correctional facility and in some embodiments, the lists of inmate-specific authorized individuals (that is, the list of people that a given inmate is allowed to call over an authorized phone at the facility), and other criteria described herein, the processing system may determine a level of confidence (also known as a "tier") that the device is contraband.

Devices that satisfy a predetermined level of confidence based on available data in memory may be deemed by the processing system (and by users via the UIs) to constitute contraband devices. The processing system (or a user via the UI) may generate a list of these devices, also referred to herein as "tier one" devices, and may perform various undertakings described herein that authorize and validate the devices. One such undertaking is the necessary transfer of ownership of the contraband devices to the contracting entity. The transfer of ownership authorizes the contractor to request the carriers to ban the phone. The devices are validated, and a list of the validated tier one devices may be provided to the GSMA's database of lost, stolen, or in some embodiments, contraband phones. In some arrangements, the GSMA may delegate or contract out the responsibility for these databases or for other actions to another party. Thus, for purposes of this disclosure, the actions of managing the databases and acting as an intermediary between the carrier and the contractor may be performed by another entity without departing from the scope of the present disclosure.

The information in the database may be used by the carrier as an indicator to a specific gateway to block user access by a tier one device to a remote network, when an attempt is made to use a contraband device. A "remote network" for purposes of this disclosure is any network (e.g., a voice or data network) typically other than one at the correctional facility, in which a contraband device is attempting to access to communicate from within the correctional facility to outside the correctional facility.

In the data collection phase, when the contractor is retained to come to the facility for a few hours, days, or weeks to collect data, whether the contractor also blocks data transmission from contraband devices may be optional. In some embodiments, the correctional facility may specify that the contractor should also perform blocking of contraband devices. In other embodiments, the correctional facility's instructions to the contractor may be limited to data collection. In either case, as described herein, the contractor may gather the necessary data identifying the likelihood or levels of confidence of telecommunication devices of being contracted. The contractor may then receive ownership of the contraband devices subsequently perceived as having the highest level of confidence ("Tier one") from the Department of Corrections (DOC), because transfer of ownership is currently a prerequisite to allowing the carrier to regulate the devices. After the transfer of ownership of the Tier one devices to the contractor, the contractor may send a list identifying these devices to the consortium responsible for their network oversight (e.g., the GSMA). The Tier one devices' ID information may be provided to a consortium for recording to disable the device on any carrier network which subscribes to the service. The consortium, or a contractor or other designee of the consortium, may maintain one or more databases of different categories of phones or other devices that are no longer authorized subscribers of a carrier network. The carrier network may use an indicator from a consolidated database of lost, stolen, and in some cases contraband devices to determine whether to prevent a device from accessing a remote network. Where an attempt is made to access the remote network by one of these contraband devices, an indicator per received by the carrier (or automatically) to the gateway controlling access to the remote network at issue. The gateway then blocks access to the remote network.

Because the contraband devices can be blocked at the carrier level, the contractor no longer needs to establish long term or permanent residence at the correctional facility after the initial preconfiguration period. While subsequent periodic visits may be requested from time to time to gather additional data, they may not be necessary since the contractor has already identified the authorized devices. The blocking of the contraband communications at the carrier level eliminates the contractor's need to permanently monitor the facility, as in conventional solutions. This may result in a large cost savings to the correctional facility, which cost savings may be transferred to the taxpayer. Also, the concerns of "bleeding" spurious, interfering transmissions outside the facility may largely eliminated, since the contractor no longer has a need for a base station at the facility.

It should be noted that, while the entity managing the data collection and subsequent duties is referenced herein as a "contractor" or "contracting firm" purely for convenience, this reference is not intended to have any legal significance, and is not intended to limit the disclosure in any way. Thus, for example, the contractor need not be contracted by the carrier to perform the activities herein.

Figure 1:
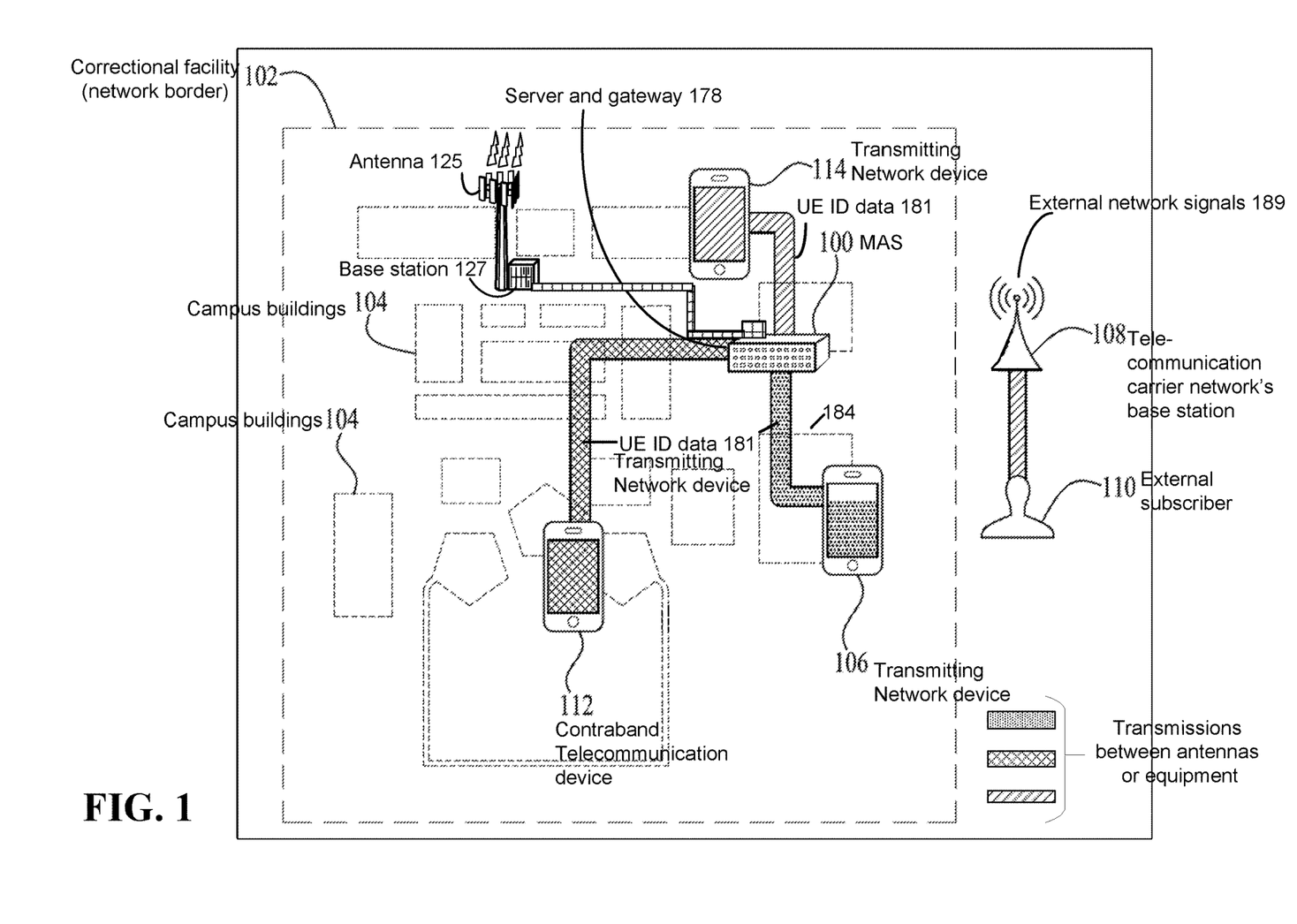
FIG. 1 is a diagram illustrating an example of a Managed Access System (MAS) that may be used at a correctional facility during a preconfiguration period for collecting data.

FIG. 1 is a diagram illustrating an example of a wireless communications system and a managed access system 100 that may be set up at a correctional facility 102 by the contractor during a pre-configuration period. The correctional facility 102 may be divided by the contractor into a correctional facility network border which encompasses the grounds of the facility and which is also used for establishing the size and geometrical area of the network to be used by the contractor for data collection and possible data flow restriction activities. The purpose of the network setup is to gather information and other historical data about devices that are transmitting at the prison to remote networks outside the prison (and vice versa). An example remote network may include a cell external to the network facility 102 and served by base station 108, which can be then accessed by an external subscriber 110 using an authorized telecommunication device for the carrier that runs base station 108 and the corresponding cell. The remote network including the base station 108 is not affected by the MAS at the correctional facility, since signals from contraband devices can be intercepted by base station 127 and remain internal to the correctional facility. The external network 108 is identified merely to demonstrate that a carrier network may often be near the correctional facility.

It should be noted that FIG. 1 is not drawn to scale. Rather, its components are minimized to avoid unduly obscuring the concepts of the disclosure. For example, while base station 127 appears in FIG. 1 to be physically adjacent the network border 102 of the facility and hence the external base station 108 of the neighboring telecommunication carrier (e.g., AT&T, Verizon, etc.), it is nonetheless assumed for purposes of this example that the base station 127 has the power and direction of antenna 125 steered appropriately to cover the network within the correctional facility, without appreciable (if any) bleeding to regions outside the network border 102 of the correctional facility.

Raw data collected based on transmissions of telecommunications equipment in the correctional facility network 102 may be used to establish and identify various levels of confidence for determining whether a device is a legitimate network device or is contraband. A device that is not likely to be contraband may be assigned a low level of confidence. Devices that may be contraband can be assigned a higher level. Eventually, a threshold level of confidence can be satisfied (e.g., met or exceeded) such that the device is known to be contraband or is very likely to be contraband based on the data analysis by a processing system along with user input (e.g., FIGS. 3, 4A, 4B).

The configuration of the MAS 100 may include a temporary wireless communications system. The MAS 100 may include a base station 127 having an antenna array 125 that is directed or steered and powered as precisely as possible such that the geographical coverage includes an energy and bandwidth that falls within the range of the correctional facility's grounds (defined generally by the network border 102). In some implementations, more than one base station may be used. The base station may be coupled via a backhaul connection 184 to additional network equipment, including server and gateway 178. The server and gateway 178 may be included, for example, within a temporary room implemented in one of the campus buildings 104 on the facility. That said, the MAS is a tactical system and as such, it can be deployed nearly anywhere, including for example a tower, roof, fence line or from the contractor's roaming trailers. The server and gateway 178, along with workstations, related network equipment and temporary storage, for example, may be used to receive and process all the data involving data transmissions ideally from all devices within the border 102 of correctional facility.

In the arrangement of FIG. 1, the server and gateway, 178, base station 127 including the antenna array 125, and all the other network equipment may be implemented by the contractor that is performing the pre-configuration data gathering stage. The server and gateway 178 may also include other network components, as necessary to enable the server to properly process devices over one or more network protocols (e.g., LTE, 5G, etc.) and to process this information for temporary storage, or for subsequent storage into a memory at the contractor's facility (e.g., FIGS. 3, 4) as described further below. The server and gateway 178 may be equipment belonging to the contractor, which ideally can be brought into the correctional facility on a temporary basis and set up in an efficient manner for temporary use at the correctional facility 102.

In some embodiments as noted, the correctional facility may request that the contractor also proactively block unauthorized transmissions (voice calls, texts, data transmissions etc.) while the contractor is concurrently on the premises gathering the historical data. In this embodiment, the contractor may configure the base station 127, server and gateway 178, not merely to identify raw transmission data, but also to selectively allow or block transmissions going in and out of the correctional facility 102. To allow authorized calls, the server and gateway 178 may connect to a base station 108 over a secure line external to the correctional facility 102, e.g., to or from an external subscriber's 110 telecommunication device. If the device is on the "list" provided by the correctional facility to the contractor and the device is authorized, the contractor can allow the call/text/data to proceed without interruption, either via the gateway 178, or by redirecting the transmission to a third party operator for completing the call/text/data to its intended destination. However, if the call identifies the subscriber device as not being included on a facility-provided list or file of authorized subscribers, for example, the server 178 may provide an indication to the gateway at the correctional facility to intercept the communication, as before.

Depending on the arrangement which may take into account the size of the facility and the need for security, the contractors may be commissioned by the facility to stay at the facility for a day, a few days, a few weeks, or if necessary, a few months. In addition, in some embodiments, the contractor may be requested (or may request) to return, e.g., to adjust settings at the facility or to gather additional information. Unlike in conventional systems, however, when the contractor leaves the facility, the contractor generally takes with it the base station, server, and other network equipment. That is to say, once the contractor leaves the facility 102, the contractor's responsibilities for blocking calls ends, and the contractor passes that duty over to the different carriers in the manner described below.

Referring still to FIG. 1, in performing setup at the facility, the contractor may employ additional equipment such as spectrum analyzers. Spectrum analyzers can measure the emitted signal power at specific frequency ranges. They can be used in this case to help ensure that the contractor's base station transmissions via antenna 125 are not bleeding outside the facility and interfering with external users outside the prison walls. If the spectrum analyzers suggest that such leakage may be occurring, the antennas' direction and/or power can be adjusted until the base station 127 falls within appropriate power levels.

The MAS 100 may include a server and gateway 178 may which, as noted, be temporarily-situated in an available room within the facility or on the perimeter for gathering data. The gathered data may be stored in an interim computer-readable medium, for subsequent transmission to an off-site memory repository. In some embodiments, the gathered data deemed relevant to the selective transmission process may be sent directly to an off-site memory (not shown) via a secure network connection. In the embodiment shown, the MAS 100 includes a bases station backhaul link 184 for transmitting data received at the base station to the server and gateway 178. The base station 127 is coupled at one end to the antenna array 125, and at another end to the gateway 178 via backhaul 184. If the server in this case recognizes an authorized device transmitting data, the server may permit the gateway 178 to route the internal data to the base station 127, which transmits the data from the facility to an external network. Thus, while the contractor is present at the facility, the server may allow the gateway to pass authorized devices, while proscribing the gateway from transmitting data from contraband devices.

Data collection during preconfiguration period. The raw data collected by the MAS 100 from the transmitting devices may include metadata included with various message. Other relevant identifying data that may be transmitted from different devices includes IMSI (International mobile subscriber identity), IMEI (International mobile equipment identity), GUTI (Globally unique temporary ID), SMS (Short message service), and other relevant data not limited to this list.

The data initially collected by the MAS includes data originating from the signaling layer. This signal layer information includes identifying information of the telecommunication devices, the location of the system (i.e., the location within the facility from which or to which the inmates are transmitting) the received signal strength indicator (RSSI) of the transmitted signals, etc. Additional relevant data includes the location from where the base station 127 was transmitting, the time and data stamps of the communications, geolocation information, the direction of the transmission, the type of antenna being used, the beamwidth of the signal, round trip time for transmissions to and from designated points, chip rates of the transmission, etc.

The correctional facility may include within its border a number of telecommunication carrier devices (e.g., 106, 112, and 114) that may be powered on and even operational at one or more times during the expected stay of the contractor. Each of these UEs may be transmitting UE ID data 181 in various forms which can include the raw data, or other data types, identified above. The contractor may receive additional information from third party sources that may assist in heightening or lowering the respective levels of confidence of various devices. The contractor may have received as noted above data from the correctional facility, or from the Department of Corrections (DOC) that may include details such as an identification of authorized device's (e.g., the warden's and guard's mobile devices, etc.). Third party data may also be received regarding suspicious devices.

After the contractor's equipment is set up, the temporary network user equipment(s) 106, 112 and 114 may be identified via a base station 127 with a facility-directed antenna array 125 along with the server and gateway 178 and other network components. The MAS 100 may begin by collecting wireless transmission from the handsets to gather information. In some embodiments, the MAS 100 may be more sophisticated, and may employ a person or robot walking around the facility 102 with a transceiver for capturing transmitted cellular or other wireless data.

The data passed along to the server may be further subdivided into voice call attempts versus SMS attempts along with the header data and content, and other information.

It will be appreciated that the temporary blocking duties performed by the MAS 100 are not necessary to the principles of the disclosure. In various embodiments, the contractor may access the network at the correctional facility to use its equipment solely to collect transmitted raw data for subsequent use in identifying potential contraband, and for providing authorized versions of that data to the applicable carriers for blocking remote network access thereto.

After the identified data has been collected and the contractor's responsibilities have concluded, the data may be returned to another location. The other location may be any location, but in one embodiment, the identified location may be where the contractor's facility resides. For example, the identified data may be routed to the contractor's facility over a secure network connection in or near real time. In other embodiments, it may be stored in a cloud and subsequently transferred to the contractor's facility. In still other embodiments, the identified data may be secured in flash memory or redundant memory arrays at the correctional facility, with the memory being transported at the conclusion of the analyses at the correctional facility to the contractor's facilities. In some embodiments, the contractor's facilities may be located at the correctional facility itself.

Figure 2:
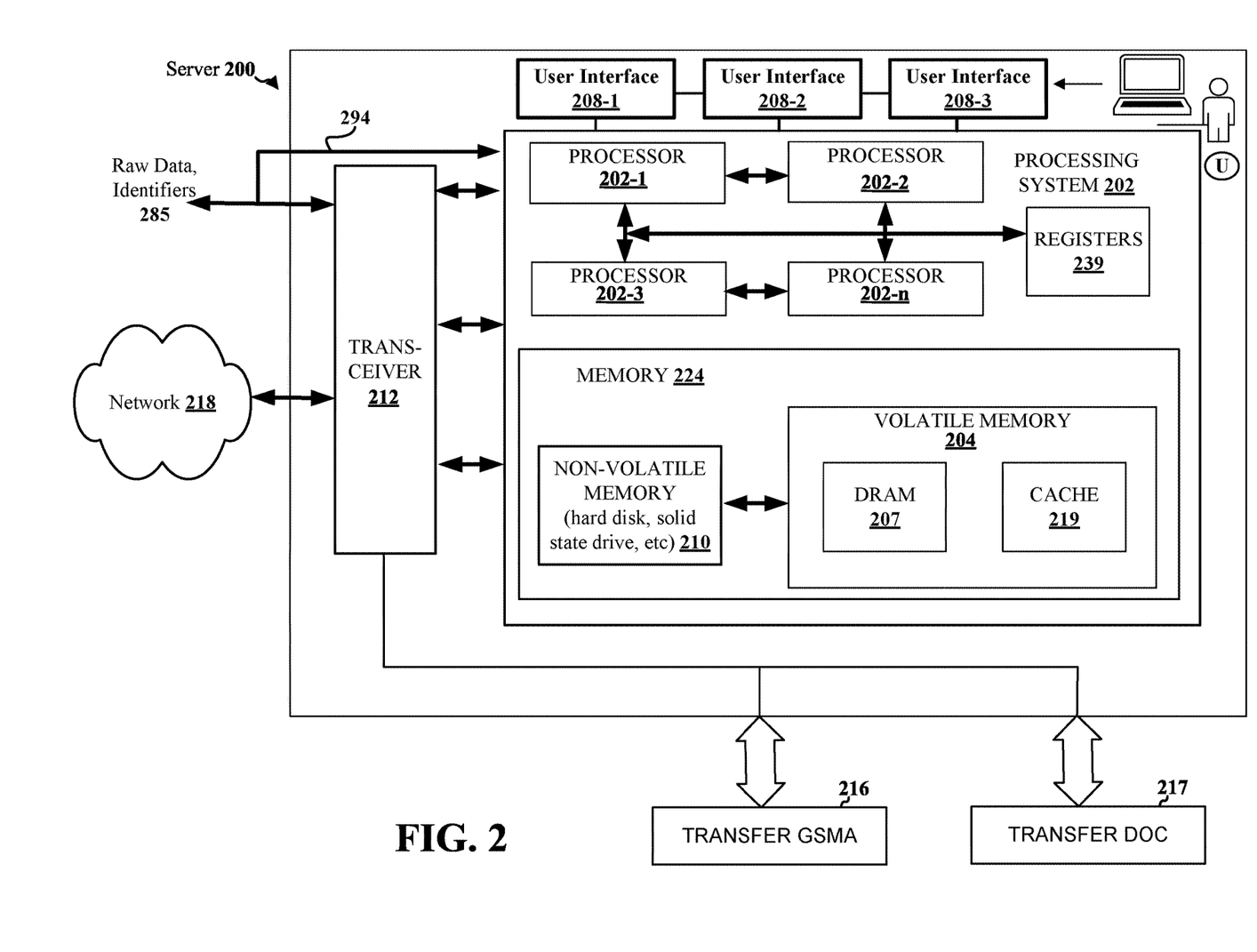
FIG. 2 is a block diagram of a server used for processing data retrieved from a correctional facility.

FIG. 2 is a block diagram of a server 200 used for processing data retrieved from a correctional facility. The server 200 may include a processing system 202. The processing system may include one or more processors 202-1-202.$n$. Examples of processors 202-1 may include those types of processors specified above, among others. Each of processors 202-1, 202-2, 202-3 through 202-$n$ in the processing system 202 may execute code from registers 239. Registers 239 may be arranged in any logical way, with more than one rows or columns to accommodate multiple contemporaneous operations, etc.

In some embodiments, one or more, or all, of the registers 239 may be included in memory 224. Memory 224 may include computer-readable media such as non-volatile memory (NVM) 210. The NVM 210 may include flash memory, hard disks, solid state disk drives, and the like. Memory 224 may also include volatile memory 204, including dynamic RAM 207 used to store high speed applications when the server 200 is performing intense computation using multiple suites of software, for example. Volatile memory 204 may include cache memory 219, which may be one or more levels of the different processors' most recently used information, and which may be used by processors 202-1-202-$n$ for fast access to the data.

In some embodiments, the memory 224 is deemed to be included with the processing system 202. However, these systems are identical to systems in which the processing system and memory are configured to be different components. For example, FIG. 2 broadly shows a system including a processing system and a memory (and other components). This is equivalent to a system that includes a processing system and a memory, regardless of whether the memory is illustrated to be part of the processing system.

Server 200 further includes a transceiver 212 coupled to the processing system 202 for transmitting and receiving data to network 218 which may, for example, be part of the Internet. In some embodiments, the server 200 belongs to the contractor, and the data collected during the contractor's visit to the facility is stored in the memory 224 (for example, in a database in NVM 210). In some embodiments, the data collected is transported over a secure channel on the network (e.g., streamed in or near real time, or streamed subsequently on demand, or sent via one or more files. The collected data may also be physical transported to the server 200, e.g., using one or more solid-state drives (SSDs), thumb drives, flash drives, or other structures. The data is input into the memory 224, whether directly via input 294 or through transceiver 212 via 285. Processing system 202 may include user interfaces (UIs) 208-1, 208-2, and 208-3, such that the data in the processing system 202 and memory 224 can be readily accessed and manipulated in any form of client-server relationship, e.g. by one or more corresponding users "U" or natively. Thus, the processing system 202 may, but need not, be implemented in a traditional server.

FIG. 2 also shows a transceiver interface "transfer GSMA" 216. This specialized interface, which may in some embodiments be part of transceiver 212. The Groupe Speciale Mobile Association (GSMA) is an association representing the interests of mobile operators and the mobile industry worldwide. Its members include mobile operators, handset and device manufacturers, software companies, mobile hardware providers and Internet companies. GSMA is standardized worldwide. Among numerous other responsibilities, the GSMA overlooks public policy and device security in connection with mobile networks. For example, the GSMA may maintain a database of phones that have certain categories such as lost, stolen, and in some cases contraband. The GSMA may also delegate these activities to other entities, such as by retaining or contracting third parties to maintain such databases. Carriers generally maintain a database of phone identifications that are lost, stolen, or otherwise unauthorized. In short, GSMA specifications indicate to the relevant carrier that a list of phones that were once subscribers of that carrier should no longer be used. Theft and loss of the device are similar to prison contraband in this respect. Accordingly, when GSMA or the designated entity receives authorized information validating that specific mobile devices are contraband, the GSMA or entity may provide this data to the applicable carrier. The carrier receives the information and thus blocks access by a corresponding telecommunication device to the network. For purposes of this disclosure, references to the GSMA may also include a designee, entity, or contractor that the GSMA may retain or otherwise engage to perform a particular task.

Part of the process of blocking cellular use on a carrier-level includes transferring data to the GSMA, which in various embodiments shown in GSMA 216 can be performed in an automated fashion using the I/O component GSMA 216. In other embodiments, a user may just send, mail or e-mail the necessary documents or files to the GSMA.

A similar I/O device or port, "Transfer DOC" 217 refers to embodiments involving an automated process of notifying the Department of Corrections that certain actions relating to blocking phones have been performed. In addition, one requirement to block such phones is for the contractor to acquire ownership of the contraband devices. Thus, the DOC may authorize the actions of the contractor, GSMA and carrier by transferring ownership or title of the tier-one contraband phones to the contractor, thereby authorizing the contractor to proceed with the GSMA. In other embodiments, these DOC documents and activities are performed manually or by mail or e-mail, as directed.

Figure 3:
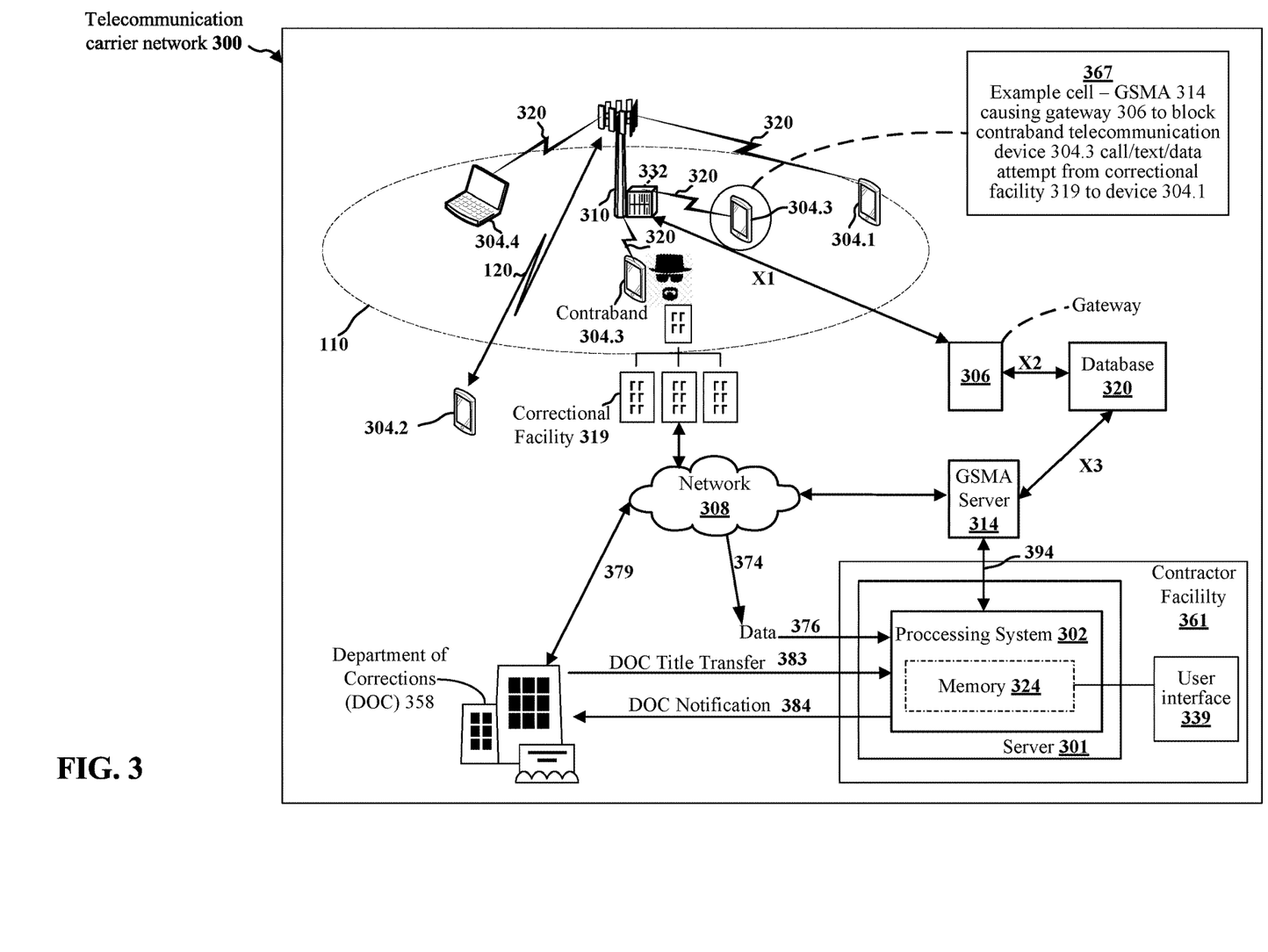
FIG. 3 is a conceptual diagram illustrating an example of a telecommunication network for carrier-based blocking of attempted calls or other transmissions to or from contraband devices at a correctional facility.

FIG. 3 is a conceptual diagram illustrating an example of a telecommunication carrier network 300 for carrier-based blocking of attempted calls or other transmissions to or from contraband devices (e.g., 304.3) at a correctional facility 319. The correctional facility 319 is assumed initially to have retained the contractor to visit the facility 319. The contractor may also obtain, from the DOC 358, the correctional facility and other third parties, additional data points for correlating the various devices.

The contractor may proceed to set up its equipment and collect the raw data as described above. Information from the DOC 358 may be sent to the data 376 input of server 301 directly. In other embodiments, the information from the DOC 358 may be sent to the correctional facility over network link 379, and then sent over network 208 (which may be a cell or other portion of the carrier network, for example) to the correctional facility 319. The DOC information may also be provided manually to the contracting firm or by e-mail, and input into the processing system using data input 376. The gathered raw data can then be provided to the memory 324 associated with the processing system 302 included in server 301 at the contractor's facility 361. The gathered raw data may include information about telecommunication devices 304.1, 304.2, 304.3 and 304.45. These telecommunication devices may communicate with the contractor's established base station 332 and antenna tower 310 over one of plurality of links 320. While 304.3 may be a contraband device, it is assumed herein that at this early stage, device 304.3 has not yet been identified as such. The memory 342 in one embodiment may include a large repository that is portioned to store different memory types, such as one or more hard drives, although any type of non-volatile memory may be used.

After collecting relevant data via input 376 (which may be one or more of any type of input device, wired or wireless, such as a wired port or a wireless antenna coupled to a port, etc.), the contractor may leave the correctional facility 319 at the agreed upon date and time. At that point, the contractor may proceed to analyze the raw data using the processing system 302, the data collected in memory 324, and the one or more user interfaces that are linked to the processing system 302. Various aspects of the disclosure that describe the manipulation of the collected data in memory 234 are now described with reference to FIGS. 4A and 4B, before returning to discuss other features shown in FIG. 3. As is also shown and discussed further below, the carrier's telecommunication network 300 includes an example cell 110, a portion of which overlaps the geographical region of correctional facility 319. While other cells from other carriers may be included in the region, and other cells specific to the network 300 cover other portions of the correctional facility 319, only the cell 110 is shown for simplicity. The carrier has a gateway/logical node 306 which is coupled via a backhaul network X1 to base station 332. The carrier also maintains a database 320. These components are described further below.

Figure 4A:
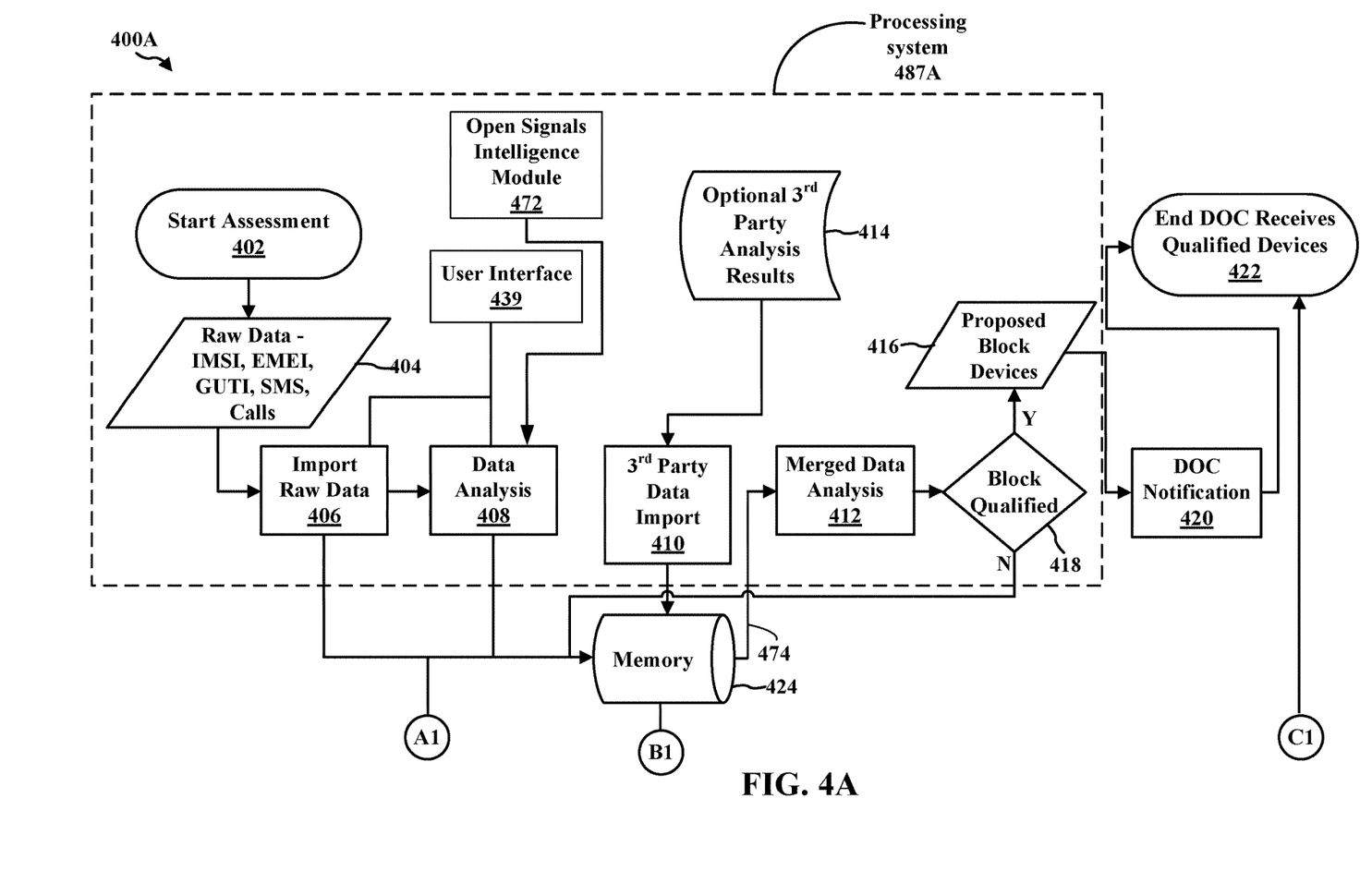
FIGS. 4A-B are conceptual diagrams of exemplary processes conducted by a processing system in a server for utilizing carrier-based blocking according to an embodiment.
Figure 4B:
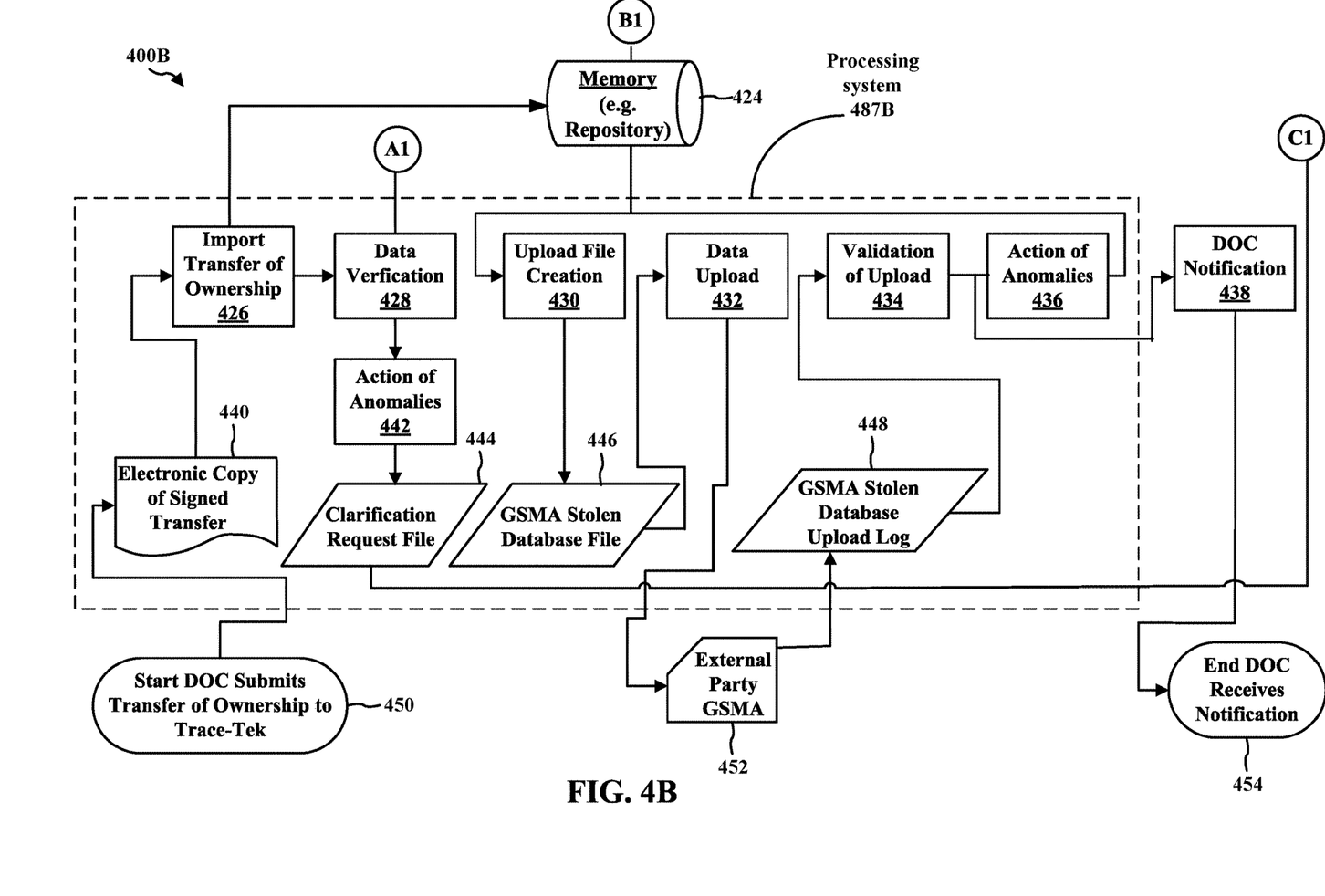

FIGS. 4A-B are conceptual diagrams 400A and 400B of exemplary processes conducted by a processing system 487A and 487B in a server for utilizing carrier-based blocking according to an embodiment. The processing systems 487A-B may be the same processing system. Unless otherwise stated or due to necessity, the steps undertaken by the processing systems 487A-B need not be in the order described. Further, one or more of processing systems 487A-B may be in different locations, and the steps taken may be performed remotely, locally, or some combination thereof.

For example, a user of the processing systems 487A-B may work from some remote location and access an image of the data in memory 324. The user may also have direct access to the data in some embodiments. The user may have a remote tablet, remote PC, etc., that may perform one or more functions described in FIG. 4A or 4B. In these cases, the processor(s) that perform these functions may be considered to be part of processing system 487A/B. In addition, the processing systems 487A-B may be implemented in hardware by the components described with reference to FIG. 2. Accordingly, the functions performed by one or more blocks in FIGS. 4A-B may be performed by one or more components in FIG. 2. In addition, other functions in FIGS. 4A-B such as communications with the DOC or GSMA may be performed using the different communications or components as described in FIG. 3.

Referring initially to FIG. 4A, block 402 is a routine indicating to the processing system 487A that a new assessment is taking place for data collected at a correctional facility as described above. The initially collected raw data may, as noted above, be imported into the contractor's system using data input 376 together with any number of techniques. In some embodiments, the data collection at the correctional facility may occur, at least in part, contemporaneously with the activities at the processing system 487A. Block 404 indicates example types of raw data (e.g., IMSI, IMEI, GUTI, SMS, voice call information) to be processed and stored in memory 424, and other information as identified in the "Data collection during preconfiguration period" section above.

At 406 the raw data and any other data relevant to the assessment may be imported into memory 424. The importing process 406 may include assigning an initial space in the memory 424 to enable the processing system 487A to have access to a snapshot, for example, to factors that include how the information, the source of the information, and the like. The importing feature 406 may include automated programs for calculating and verifying checksums, parity checks, and similar functions. The importing feature 406 may take place with the assistance or at the direction of one or more users via user interface 439.

Feature 406 may also include identifying spurious data such as unintended Arabic or Roman characters that may have resulted from data corruption at some prior time. These data may not be corrupted in cases where, for example the text message including the data is sent with the correct encoding flag to enable the system to decode and display the content. In some embodiments, the importing may include running various validations to help ensure that erroneous or corrupted records are not included and that the collected identification meets criteria identified in various standards (e.g., carrier standards, GSMA standards, etc.). For example, IMSI and IMEI data have distinctive lengths and character sets, and standardized formats. The import step 406 may check these requirements and maintain a record of erroneous data entries, or simply delete them.

In some embodiments, the importing may be performed on lower layers, including the physical and signaling layers, among others. Distances from the applicable telecommunication device to the tower may be estimated, for example, to ensure that the transmission came from the facility. The techniques in 406 may be performed by the processing system 487A in cooperation with one or more users at user interfaces (e.g., FIGS. 2, 3). These types of validation techniques may also be extended to validating SMS headers and data formats, to ensure that the incoming data is valid and properly formatted.

In some embodiments, one or more of the above routines and integrity checks may be performed in another block, such as the data analysis step 408.

After the raw data is imported into the memory 424, data analysis in step 408 can be performed. Data analysis 408 may be performed by the processing system 487A along with one or more users at user interface 439. In various embodiments, data analysis 408 is performed as a type of scoring system to identify a level of confidence that a particular telecommunication device identified at the correction facility (usually but not always through its transmissions) is a contraband device.

For example, one scoring system may define a plurality of tiers, each tier representing a level of confidence that the device is contraband. For example, a tier ten device may be a device in which there is a fifty percent level of confidence that the device is contraband. Skipping tiers, a tier three device may mean that an eighty-five percent (85%) level of confidence that the device is contraband, a tier two device may be associated with a ninety percent (90%) level of confidence, and a tier one device may be associated with a ninety-five percent (95%) level of confidence.

In other embodiments, a scoring system may define a range of tiers or levels of confidence. For example, tier one may be a device having a 90-100% level of confidence that the device is contraband, tier two may cover devices at between 80-90%, tier three may cover devices at between 70 and 80%, and so on. Either scoring system may be used. In addition, a threshold may be selected wherein when the threshold is satisfied (met or exceeded), the processing system may determine the device to be contraband requiring blocking. In one embodiment, the threshold is at 90%. Other threshold values are possible.

The different tiers described herein are exemplary in nature, and any other numerical values or criteria may be used. In various embodiments, a threshold level of confidence may exist such that the contractor is sufficiently confident that a particular telecommunication device is contraband to proceed with steps to block transmissions from the device. For example, the contractor may identify all "tier one" devices as contraband, and may proceed on that basis.

In various embodiments, the data analysis 408 may include a number of different procedures. For example, the processing system 487A may search for relevant keywords in the data portion of texts. Similarly, a user may read different texts and assign a weight to a text corresponding to a device that is a prospective contraband device. In an embodiment, the data analysis 408 takes into account the geographical relationship between the device and the base station so that if necessary, analysts can attempt to triangulate the signal. Users may dial the numbers called as identified in the data. The data stored in memory 424 may also be correlated with data obtained from an open signals intelligence module 472. Open source module 472 may include any accessible data from one or more external sources that can be used to assist in the data analysis 408. Module 472 may provide data such as the name of a subscriber associated with a particular telephone number. In this manner, the processing system 487A may be used for the purpose of gathering names of individuals called. If the individual is a family member of an inmate, for example, the transmission may be less likely to be related to a contraband device. By contrast, if the individual called has a criminal record including drug trafficking or murder, the level of confidence of the corresponding device may be increased. Data may also be analyzed to determine whether a device was turned off during the initial data collection procedure, or whether the subscriber identity module (SIM) of a device was changed.

In some embodiments, the collected data in memory 424 may include prisoner-specific data that in turn may be used in the data analysis 408. In addition to the allowed call recipients described above, the prisoner's commissary account may have been provided by the correctional facility or the DOC. Data on the commissary account can be correlated to other data received during the collection process to affect the different levels or tiers of confidence.

The data analysis 408 performed by the processing system 487A may be extensive in some case and may include factors like whether a device identified in the data had been seen in a previous assessment (by that contractor or another firm); whether any telecommunication device was involved in a SIM swap; and whether the data included specific references that an analyst or user (or the processing system 487A) may know is well correlated with the use of contraband devices. One such example may be a communication like "the guard just passed counts", which may be indicative of a "go-ahead" to proceed with criminal or policy-violating activity.

In various embodiments, data analysis activities can be automated by the processing system 487A. For example, the processing system 487A can:

perform an automated check if the formats of various data entries are correct determine whether the devices have been identified in past assessments determine if a device includes a disproportionately large number of uses or SMS texts determine a zone in which the device resides identify keywords that are relevant to establishing whether devices are contraband It should be noted that the above techniques are exemplary in nature, and the data analysis 408 may include other activities, automated or otherwise, that ultimately contribute to (or lessen) the level of confidence of any specific device. In addition, the starting level of confidence may differ under different types of procedures. As one example, a device may have an initial assigned level of confidence, if applicable, based on some event made known to the contractor. Other devices are not identified until the data is imported and analyzed and as such, there initially is no level of confidence associated with these as yet unknown devices. After devices are discovered and as the process moves ahead, the various devices may be assigned the relevant levels of confidence.

In various embodiments, the output of the data analysis 408 is a scorecard that is saved to memory 424. The scorecard may include data sufficient to identify the device with particularity (e.g., to a carrier), and the tier or level of confidence that the device in contraband. In some embodiments, other information may be included, such as the tests that were performed and the results of the tests. In one embodiment, devices that have a ninety-five percent (95%) level of confidence satisfy a threshold that the device is contraband. However, this number is exemplary in nature, and other threshold values are possible.

In some embodiments, results from other third-party sources that may attempt to identify contraband telecommunication devices at a facility may be available, such as in block 414. These results may include data from prior searches or data from analysts or investigators used for performing the same types of analyses. At 410, third party data is imported into the system. Thereupon, at 412, validated data from these third-party sources may be merged with the existing data in the memory 424.

In some cases, third party data can be antiquated, biased, or otherwise unreliable. Accordingly, in some embodiments, the users at processing system 487A may independently validate the data before or after it is officially merged with the existing data collected in memory 424. As before, the validation/analysis of the data to be merged may be automated at least in part. Data or results deemed unreliable may not ultimately be merged in some embodiments.

In other embodiments, the data import step 410 carefully demarcates the data previously collected from new proposed new third party data. At 412, the processing system 487A may perform an analysis of the validated third-party data. The analysis at 412 may involve a combination of automated procedures performed directly by processing system 487A, with reviews and other analyses potentially performed by analysts or other users via user interface 439. For example, a user may review the data to confirm whether it is reliable, or even applicable to the existing data set. As shown by data line 474, the results of the data analysis stored in memory 424 may be provided to the merged data analysis block 412 to conduct comparisons or to modify the data as necessary. The results of the merged data analysis 412 may include the scorecard of one or more, all, some, or none of the devices being modified. In some cases, new devices are identified from the merged data, and scorecards for the new devices are created. In some embodiments, existing data is modified to account for corrections identified by the third party data.

The use of data from different parties, such as in the merged data analysis 412, may be valuable because the parties that provided the data to be merged may in some cases have access to databases or information that the contractors do not. Thus, the processing system 487A can increase the reliability of the data in memory 424 in these events after the merged data analysis 412 is performed. The merged analysis step can enable the user of processing system 487A to establish facts like why a tier for a particular device should be changed. Examples of third party information may include calls referencing a certain payment account not otherwise accessible to the contractor, authorized phone lists, if that data is not provided to the contractor, and similar data.

In one embodiment of either the data import 410 or the merged data analysis 412 procedure, the third-party data includes reference to different devices that may be alleged to be contraband, for example. The processing system 487A may thereupon be prompted to check the devices in the existing data set (in memory 424) to ascertain why a difference exists. At 412, modifications may be made, if necessary, to the existing data in memory 424.

Whether performed in the original data analysis 408 or the merged data analysis 412, the use of otherwise inaccessible databases and different analytics, referenced sometimes herein as third party data, can increase overall confidence. For example, certain applications track telephone numbers and keywords. Other databases may show certain calls that are historically blocked, for example. The data analyses in 408 or 412, as applicable, can take into account such historical data. The open signals intelligence module 472 referenced above can be used to provide the processing system 487A with access to databases not currently accessible to the contractor. For example, the open signals intelligence module 472 can provide the phone list for each inmate, and other analytics that can be used in the data analysis. This access and supplemental analysis may result in changing or augmenting the scorecards. In the example noted above, where the new analytics show that the phone number in question is a family member of the inmate, the data may be adjusted accordingly.

In one embodiment, to properly track the changes to the data, the processing system 487A may be configured to store snapshots of the original data set imported into the memory 424 as a first data set. Thereafter, modifications to the original data set may be stored in sequence as snapshots to ensure that the raw data is known, and all changes and their dates of entry or insertion are known.

After adjusting the scorecards in step 412 to account for the third party analytics 414 and other factors, processing system 487 may produce a revised data set that includes an identification of each of the devices and a corresponding level of confidence. That is to say, the output of the merged data analysis block 412 may be an updated set of all evaluated devices and their respective levels of confidence.

Before the data can be properly used in connection with blocking identified devices, certain procedures in certain embodiments are required. For example, certain regulations or specifications may require that title to the contraband devices must be in the name of the contractor before the contractor can ask a carrier to block activities from that device. In addition, this authorized data has to be validated. After this occurs, the authorized, validated data can be provided to the GSMA to block the devices at the carrier level. These steps are described in detail with respect to FIG. 4B and are addressed subsequently.

At block qualified (418), the processing system 487A may determine which of the devices is contraband. In one embodiment, all tier one devices satisfy the threshold and qualify as contraband. A "Y" determination allows the processing system 487A to create a list of proposed block devices 416.

The proposed block devices 416 include a list of device identifiers determined by the processing system 487A to qualify as contraband. The identifiers (IDs) can be various types of identifications that are sufficient for a carrier to identify and locate such a device attempting to access a remote network (e.g., a network external to the facility). In some embodiments involving different carriers, the list may identify the carrier, if that not implicit. In other embodiments, a list can be created for each carrier.

An "N" determination sends the data regarding tier two and remaining devices to be preserved in the memory 424 for future analysis. In other embodiments, the threshold for identifying what constitutes contraband may be different, and other levels of confidence or combinations thereof are possible. In the diagram shown, both Y and N may apply to the determinations, since there may exist both tier one devices meeting the threshold and tier 2+ devices not meeting the threshold.

After the list of proposed block devices at 416 is generated, the processing system 487*a* causes the list to be transmitted to the DOC, or a designated location accessible to the DOC. In some embodiments, a user may send a link to the DOC that identifies a secure network location of the list. In other embodiments, a user may simply e-mail the list to the DOC. In still other embodiments, the entire procedure is automated and the list is sent to the DOC after completion, optionally upon a user's confirmation.

Together with certain interfaces identified at A1, B1, and C1 of FIG. 4A and describing additional events or electronic information, the processing system 487A can be used to block the attempted use of contraband devices on list 416. Accordingly, the DOC may receive the list of contraband devices, as in DOC 420. Subject to a clarification in FIG. 4B, the end of the DOC notification process, wherein the DOC receives a list of the qualified devices, is shown at 422.

Referring to FIG. 4B, the processing system 487 may also facilitate performance of the authorization that may be needed in certain embodiments to effect the legally proper seizure of the contraband devices identified in list 416 (FIG. 4A). It will be understood by those skilled in the art upon review of this disclosure that these embodiments are not intended to limit the scope of the disclosure. Authorization for an entity to perform the actions described herein may under different circumstances manifest itself in different ways, and the principles of the present disclosure are inclusive of these different ways. Thus, the below description of certain features of the disclosure is intended to be exemplary in nature and not restrictive nor exhaustive.

For purposes of this disclosure, processing system 487B may be identical to processing system 487A; that is, the two system may be one in the same. For example, they may represent the processing system 302 of FIG. 3. In other embodiments, processing system 487B may be a different system, for example, in the same facility or the same server. Processing system 487B may also include processes run by users on remote devices accessing server 301.

Once the contractor leaves the Correctional facility 319 (FIG. 3) and removes its base station and network equipment (FIG. 1), and assuming that the contractor was commissioned to block contraband devices, it can no longer block contraband devices. According to an aspect of the disclosure, the contractor therefore blocks the identified contraband devices at the carrier level as described below.

It is understood that title to any contraband devices, including the contraband devices identified by the contractor, belongs to the DOC. As such, only the DOC can exercise rights to the contraband devices. As a result, once the DOC receives a list of these contraband devices, whether manually or one of the A1 or B1 interfaces of FIGS. 4A-B, or otherwise, the DOC may generate and submit a transfer of ownership form to the contractor (450). That is, the DOC may legally sign title of the phones to the contractor. Thus the processing system may receive an electronic copy of the signed transfer of ownership of the contraband devices (440)

Having received the electronic signed transfer 440, the processing system 487B may then import the transfer of ownership (426). The importation step 426 involves validating or taking a snapshot of the data, as described above with respect to FIG. 4A. For example, transferring ownership may include validating the data, or taking a snapshot of the data as it is received (e.g., into memory such as dynamic RAM or a temporary NVM (non-volatile memory)) or directly into the memory 424. The processing system 487B may use interface A1 to access the memory 424, e.g., to find the list of tier one devices that meet the threshold for contraband. The processing system 487 may compare the list in memory 424 to the list of devices and identifiers in the electronic copy of the signed transfer 440. This comparison, and other comparisons using data in memory 424, helps enable the processing system 487B to identify anomalies. Anomalies may include errors of any kind. For example, if the wrong number was inadvertently typed in to identify a device, or a defect in the format of the list is present, then the processing system 487B may take the appropriate corrective action, such as generating a new list for submission to the DOC or notifying the DOC of a change that is needed, etc. Thus some action on the anomalies 442 may be taken.

An example of such action includes the processing system 487B, based on the action of a user via a user interface 439 or automatedly, generating a clarification request file 444, or an electronic file identifying the error(s) and requesting correction. The request can be made to the DOC, and the document sent to the DOC via interface C1. Referring briefly back to FIG. 4A, the DOC at 422 can instead rectify any errors and can send back to the contractor/processing system a revised transfer of ownership (FIG. 4B; 449). The revised document can then be verified (428). If the revised document is verified to be correct using the A1 link to the memory 424, then the transfer of ownership is completed. The transfer of ownership to the contractor (or its designee) authorizes the contractor (or its designee) to perform the foregoing actions involving the contraband telecommunication devices. Here, the authorization is validated by the processing system through the data verification, meaning that the owner of the contraband devices is the contractor (or its designee). As shown by the interface C1 from module 444 to module 422 of FIG. 4B, this may end the current process of the DOC receiving the identity of qualified devices (422) for transmission to the contractor in the form of a proper ownership transfer.

After the corrected data is validated (428), any corrections needed to the data in memory 424 may be identified, and memory 424 may be updated accordingly. Thereafter, at upload file creation module 430, the processing system 487B may retrieve any information it needs from the memory 424 to provide identification information to a carrier sufficient for the carrier to identify, locate, and manage/prevent access to the contraband device in the signed transfer 440. Thus, if the needed identification information for a specific carrier requires additional detail, the upload file creation module 430 retrieves this identification information.

In some embodiments, the transfer of title to the contractor, and/or anomalies are corrected, instead using e-mail between the two parties, or even using a manual external transfer of documents. In other embodiments, these processes may be automated. In either arrangement, after ownership of the correctly-named devices is properly transferred to the contractor, the devices are now authorized (meaning in this exemplary embodiment that the contractor has legal title to the contraband devices and full access to enjoy all resulting ownership-based uses thereto), and the authorized data is validated by the processing system (meaning that the processing system has verified that the document is substantially error-free and that the names of the devices and their status are, as best seen, correct, compatible with the associated carrier, and comprehensible and meaningful when provided to the GSMA or related entity performing tasks on the GSMA's behalf).

Once the DOC provides the information to correct the anomaly, or the anomaly is corrected internally based on another matter not implicating the DOC, the action of anomalies 442 is complete for this set of transactions.

The upload file creation module 430 may further, as the name suggests, create a file to be uploaded to the GSMA. The file may be in a format that is based on one or more domestic or international standards promulgated by the GSMA or an affiliate agency. For instance, the file may include a plurality of carriers, wherein associated with each identified carrier is one or more contraband device (that was previously authorized by the DOC and validated by the contractor's server, via the server's processing system 487A-B) and any other necessary information to enable the GSMA to decipher that the one or more relevant identifiers (ID) of the device(s) at issue should be placed in a database. The GSMA may operate a global IMEI blacklisting service. The carrier members may share their own so-called black lists (e.g., reported lost or stolen devices, etc.) to a global database in order to identify and block stolen devices across multiple networks or even borders. In various embodiments, this database can be used for blocking contraband access, since the contractor is the lawful owner of the devices. Other names of the fraudulent database may be used or adopted in the future. For example, a dedicated database may be defined specially for prison contraband devices. The end result, however, will likely be similar or identical as the current use of the stolen database. That file identifying the contraband devices may then be provided to a GSMA stolen file database (e.g., a virtual region in memory 424, or a region in another, physically separate memory) at the server 301 as a GSMA stolen database file 446.

Using data upload module 432, the processing system 487B uploads the GSMA stolen database file to a remote location owned or controlled by the GSMA 452. This location may be a network link provided to others by the GSMA for uploading related documents. In some arrangements, the upload is an e-mail sent by a user or sent automatically. In still other arrangement, the contractor may provide a secure location with the file uploaded to it, and then may provide the GSMA with a secure link. Other transmission possibilities are possible.

The nomenclature "GSMA stolen database file" may be used when the GSMA instructs that device owners direct such requests (that is, requests related to contraband devices at inmate facilities) to be included in a stolen database. However, in other embodiments, the GSMA may provide other directions. For example, as the representative of domestic and international carriers, the GSMA may create another category of "contraband" telecommunication devices that should be treated by the applicable carrier as such. Thus "GSMA stolen database files" generically refer, for the purposes of this disclosure, to contraband devices whose attempts at remote network access should be thwarted by carriers.

After the data upload 432 is complete, it is assumed that the GSMA stolen database file is in the possession of the GSMA at the GSMA's servers. At some point thereafter, the processing system 487B may receive a GSMA stolen database upload log file 448, which confirms receipt of same by the GSMA. The upload log 448 also includes an indication to the contractor which of the requests for inclusion (e.g., to the stolen or contraband database) have been accepted and which, if any, have not. It should be noted that, regardless of which carrier the contraband device is a subscriber on, all carriers should be given the ID of all devices to avoid roaming, for example.

In various embodiments, once the upload log file 448 is received, the processing system 487B may perform another validation of its uploaded file 432 in an attempt to determine whether an error prevented the acceptance of the contraband device. If the validation is successful, then the contractor may opt to decline further action, particularly if the device was already in question, or no more information is available to justify further searching. If an error is found, then depending on the error(s) the contractor may perform another anomalies action 436.

If data retrieved from the memory 424 by module 436 shows the source of the error, then in an embodiment, the processing system 487B (e.g., as prompted by the user) may cycle through another upload file creation and data upload (430, 432) to provide an updated GSMA stolen database file 446 with only the corrected entries to the GSMA. If the ensuing log file indicates minimal or no rejections to the identified contraband devices, the processing system 487B may opt to complete the process from its end.

For example, in some embodiments, the processing system 487B will proceed with another validation 434. If successful, the processing system 487B may, on its own or via e-mail or a manual procedure, etc., send a notification of completion to the DOC at 438. The notification may include the results of the findings by the contractor and the devices rejected, if any, by the GSMA. Upon the notification to the DOC at 438, the process at this time ends 454. Control has then been passed by the contractor and DOC, collectively, to the carriers as described below.

The GSMA, having regulatory authority over international and domestic carriers, also includes databases that the GSMA expects compliant carriers to access and to follow the protocols in the applicable standards. For example, a carrier on U.S. soil (e.g., Verizon) may be expected to periodically (or continuously) access a stolen file database of the GSMA and treat the identified devices in that database accordingly. For example, the GSMA may define a process in which the carriers download/cache the file and update it to that carrier's registrars or similar file locations, which may reduce network activity to the GSMA. This review of the relevant database by the carrier is relied on by the correctional facility and contractor alike in preventing access by inmates and other unauthorized users to contraband devices.

Other embodiments may structure the distribution of databases in a different way, or still other embodiments may rely on streaming or file-driven communications to carriers to provide and update relevant data regarding authorized and validated instructions to circumscribe network access in the manner specified. For these reasons, the carrier-level nature of this disclosure is not limited to the embodiments above that rely on databases, but also includes other means of notifying the carriers to prevent remote network access.

Referring back to FIG. 3, an example of carrier action in the wake of a database that includes a relevant contraband device is disclosed. The raw data collected by the contractor when its equipment was resident at the correctional facility 319, along with other lists and third party/open signals communications, is transmitted through data inputs 376. Similarly, the DOC transfers title or otherwise authorizes the relevant actions for the contractor, as permitted by the applicable statutes and commercial regulations, etc., using data input 383. The ending notification from the server 301 and associated processing system 302 back to the DOC is shown as output 384.

The simple nature of these inputs and outputs are for simplicity, to avoid obscuring the relevant concepts of the disclosure. This is in part due to the fact that the disclosure also contemplates use of e-mail and even manual activities to ensure the chain of operations by the server 301 continues to flow in time. The interface 394 connecting the processing system 302/server 301 to the GSMA server 314 is also shown, with the stole database file sent from the processing system 302 to the GSMA server 314 and the corresponding log file returned from the GSMA server 314 to the processing system 302.

Component 306 is a gateway/logical node that governs the flow of network traffic to and from cell 110. While component 306 may be coupled to more than one cell or network, for simplicity, a single cell is shown. The cell 110 may include a base station 332 which in turn includes a transceiver tower 310 for sending and receiving signals within its allotted cell. It is still further assumed that the cell encompasses at least portions of, the correctional facility 319. In one embodiment, the carrier that controls the telecommunication network 300 in FIG. 3 includes a gateway coupled via backhaul X1 to a base station and its tower 332 and 310, respectively. The carrier includes a database 320 coupled to gateway 306.

In one embodiment, telecommunication device 304.3 (e.g., a cellular telephone) had been exchanging data unbeknownst to the correctional facility 304.3 during the prior monitoring by the contractor of the correctional facility. Device 304.3 may be deemed contraband, as determined by the server 302 at the contractor facility. For example, the transmitted data was stored and thereafter provided to the memory 324/424 in the server 301. The processing system 487A-B, along with analysts accessing the processing system via user interface 339/439, may make the above determinations and may transfer the data to the GSMA server 314. The GSMA server 314 may include accepted data into its lost/stolen database, or other applicable database. Thus, contraband device 304.3 has been aggregated in a relevant database location in the GSMA server 314. Regardless of the name or other objectives of the database, at least one objective of the database in the GSMA server 314 is to notify carriers to prevent network access to the devices specified therein.

Referring to the carrier's database 320, the database 320 may be configured to store information provided by the processing system 302 related to the contraband telecommunication device 304.3. In an embodiment, the database 329 is responsible for receiving from the GSMA server 314 over connection X3 which may be a wired or wireless connection, informational messages, broadcasts, or similar data regarding the content of different databases.

The database 329 may further be configured to provide an indicator to the gateway over example bus X2 in response to an attempt by the contraband telecommunication 304.3 device to connect to the remote network, which for these purposes may include telecommunication network 300 and cell 110.

The gateway 306 may also be is configured to prevent the contraband telecommunication device 304.3 from connecting to the remote network 300 in response to the indicator from the database 320. Accordingly, the contraband telecommunication device is blocked from using the base station 332 of cell 110 of network 300 of the carrier. For example, the gateway 306 may provide a message to base station 332 over X1 to not allocate network resources to contraband device 304.3, to not forward data from device 304.3 to any remote network, and to not forward data intended for device 304.3 to device 304.3.

In a more realistic urban scenario, a plurality of similar networks with similar components (possibly distributed in a different matter but including the functions of updating its databases and monitoring network access, etc.) may be distributed throughout the region, each with its own databases and indicators to prevent access.

FIG. 4 is an exemplary flow diagram describing certain aspects of the disclosure. The steps of FIG. 4 may be performed by one or more of the server 301, processing system 2021, 302, and 487A-B, and carrier network 300 and other network components described throughout the disclosure.

Figure 5:
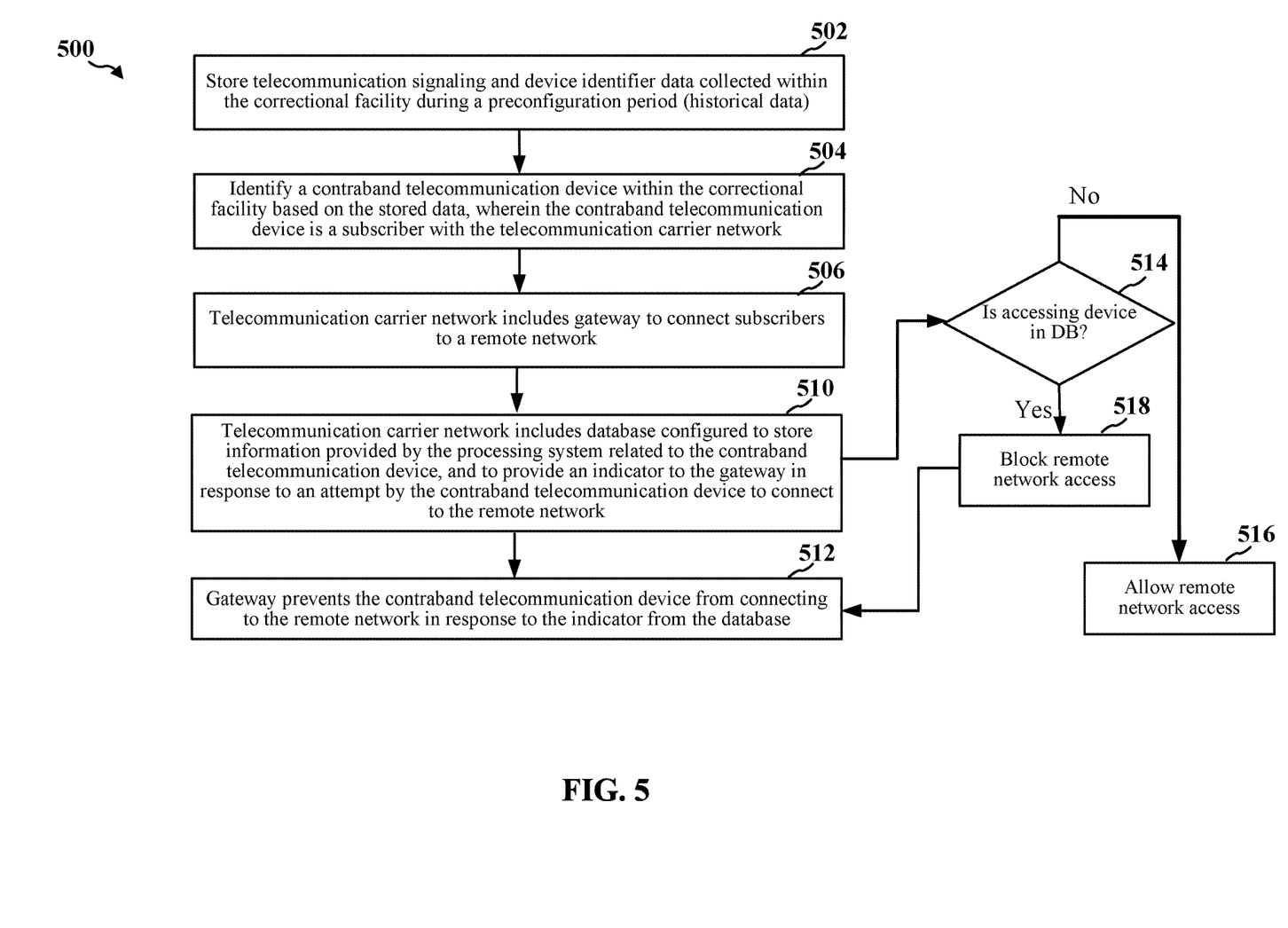
FIG. 5 is an exemplary flow diagram of a method for carrier-based blocking according to an embodiment.

Referring initially to 502, the contractor may be commissioned to spend a period of time at a correctional facility (e.g., 6 months, one year, 3 months, etc.) during which time it uses a dedicated network connection to collect transmitted data as well as data provided by the facility and third parties. A processing system of a computing device may store the telecommunication signaling and device identifier data (e.g., signaling formats, IMSI, SMS data, voice call data, TCP/IP transmissions, and all alphanumerical or binary representations of any field representing the device data or the features, formats and structure of the signaling corresponding to the payload being transmitted, among other telecommunication signaling and device identifier information described in this disclosure) collected within the correctional facility during this preconfiguration period.

At 504, the processing system may identify a contraband telecommunication device within the correctional facility based on the stored data, wherein the contraband telecommunication device is a subscriber with the telecommunication carrier network, such as network 300 and its cell 110. The telecommunication carrier network includes a gateway or other cell-regulating component to connect subscribers to a remote network, as in 506.

The telecommunication carrier network includes database configured to store information provided by the processing system related to the contraband telecommunication device, and to provide an indicator to the gateway in response to an attempt by the contraband telecommunication device to connect to the remote network, as in 510.

At 512, the gateway of the carrier prevents the contraband telecommunication device from connecting to the remote network in response to the indicator from the database. For example at 514, the gateway may, via the base station or otherwise, determine whether a device attempting to access the network is in the banned database. If not, the gateway may proceed to allow access to the remote network, as in 516. If so, such that the gateway receives an indicator identifying the device as contraband, the gateway may proceed to prevent the device from accessing a remote network.

The benefits of the subject matter claimed herein are immediately apparent. One of many advantages is that the correctional facility no longer has to retain a lifelong contractor (or other company) to maintain a network for banning contraband. This alone can save the facility significant expenditures. Only a single visit, or a few visits, by a contractor over a long period can suffice to block contraband over the long term. Further costs savings can be achieved by passing the requirement to block access to the individual carriers, rather than placing the onus of such a task on the correctional facility. The contractor can meanwhile use all assets at its disposal to collect its own data as well as to query open information sources to add sophistication and elegance to its contraband-related algorithms.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims. Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A system for blocking contraband telecommunication devices within a correctional facility, comprising:
   a telecommunication carrier network;
   memory configured to store telecommunication signaling and device identifier data collected within the correctional facility during a preconfiguration period; and
   a processing system configured to identify a contraband telecommunication device within the correctional facility based on the stored data, wherein the contraband telecommunication device is a subscriber with the telecommunication carrier network;
   wherein the telecommunication carrier network comprises,
      a gateway configured to connect subscribers to a remote network, and
      a database configured to store information provided by the processing system related to the contraband telecommunication device, and to provide an indicator to the gateway in response to an attempt by the contraband telecommunication device to connect to the remote network, wherein the gateway is further configured to prevent the contraband telecommunication device from connecting to the remote network in response to the indicator from the database, wherein the processing system is further configured to assess the data to generate the information identifying the contraband telecommunication device based on determining a threshold level of confidence that the device is contraband, and wherein the processing system is further coupled to a user interface (UI) and a display, the UI and the display configured to enable a user to analyze the data for determining a level of confidence that an identified telecommunication device is contraband.

2. The system of claim 1, wherein the processing system is further configured to receive external data or applications during the assessment for further use in determining a level of confidence corresponding to whether an identified telecommunication device is contraband.

3. The system of claim 1, wherein the information provided by the processing system further includes an identification of each of the telecommunication devices in which the threshold level of confidence that the device is contraband is satisfied.

4. The system of claim 1, wherein the processing system is further configured to provide the information to the database in response to authorization from a third party entity.

5. The system of claim 4, wherein the processing system is further configured to validate the authorization prior to providing the information to the database.

6. The system of claim 5, wherein the processing system is further configured to provide the validated authorized information to a part of the database including a list of reported lost, stolen or contraband telecommunication devices maintained by a carrier of the telecommunication carrier network.

7. The system of claim 6, wherein the validated authorized information is combined with the list of reported lost, stolen or contraband telecommunication devices to enable the carrier to prevent use of the contraband telecommunication device.

8. The system of claim 6, wherein the processing system is further configured to include a request with the validated authorized information to treat the identified contraband telecommunication as unauthorized for use.

9. A system for blocking contraband telecommunication devices within a correctional facility, comprising:

a telecommunication carrier network;

memory configured to store historical telecommunication signaling and device identifier data gathered during a period of time within the correctional facility; and a processing system configured to identify a contraband telecommunication device within the correctional facility based on the stored data, wherein the contraband telecommunication device is a subscriber with the telecommunication carrier network;

wherein the telecommunication carrier network comprises, a gateway configured to connect subscribers to a remote network, and a database configured to store information provided by the processing system related to the contraband telecommunication device, wherein an indicator is provided to the gateway in response to an attempt by the contraband telecommunication device to connect to the remote network, wherein the gateway is further configured to prevent the contraband telecommunication device from connecting to the remote network in response to the indicator, and wherein the processing system is further coupled to a user interface (UI) and a display, the UI and the display configured to enable a user to analyze the stored data and to provide input for determining a level of confidence that an identified telecommunication device is contraband.

10. The system of claim 9, wherein the processing system is further configured to compare the stored data with third party data received for use during the assessment in determining a level of confidence that an identified telecommunication device is contraband.

11. The system of claim 9, wherein the processing system is further configured to generate a list comprising an identification of each telecommunication device in which the threshold level of confidence that the device is contraband is satisfied.

12. The system of claim 11, wherein the processing system is further configured to provide the list to the carrier.

* * * * *